(12) United States Patent
Kotera

(10) Patent No.: US 7,203,000 B2
(45) Date of Patent: Apr. 10, 2007

(54) SELF-CONTAINED MANUAL LIFTING SCREEN

(75) Inventor: Masayuki Kotera, Osaka (JP)

(73) Assignee: OS Co., Ltd., Osaka (JP)

( * ) Notice: Subject to any disclaimer, the term of this patent is extended or adjusted under 35 U.S.C. 154(b) by 244 days.

(21) Appl. No.: 10/511,449

(22) PCT Filed: May 8, 2003

(86) PCT No.: PCT/JP03/05734

§ 371 (c)(1),
(2), (4) Date: Oct. 27, 2004

(87) PCT Pub. No.: WO03/100519

PCT Pub. Date: Dec. 4, 2003

(65) Prior Publication Data

US 2005/0174638 A1   Aug. 11, 2005

(30) Foreign Application Priority Data

May 23, 2002 (JP) ............................. 2002-148523
Mar. 10, 2003 (JP) ............................. 2003-062676

(51) Int. Cl.
  *G03B 21/56* (2006.01)
  *G02B 7/00* (2006.01)
  *E06B 9/06* (2006.01)

(52) U.S. Cl. ............... 359/461; 359/443; 359/896; 160/84.06

(58) Field of Classification Search ............ 359/461, 359/443, 896; 348/420, 429; 160/84.06
See application file for complete search history.

(56) References Cited

U.S. PATENT DOCUMENTS

D323,338 S  *  1/1992  Court .................... D16/241
5,121,977 A  *  6/1992  Weisgerber ............. 359/450
5,468,040 A  * 11/1995  Peng Hsieh et al. ..... 296/97.4
5,706,130 A  *  1/1998  Rosen .................... 359/443
6,191,886 B1 *  2/2001  Sinkoff .................. 359/443
6,249,377 B1 *  6/2001  Takamoto et al. ....... 359/461
6,297,905 B1 * 10/2001  Takamoto et al. ....... 359/461
6,873,458 B1 *  3/2005  Bakkom et al. ......... 359/443

FOREIGN PATENT DOCUMENTS

JP  60-59247  4/1985

(Continued)

*Primary Examiner*—W. B. Perkey
*Assistant Examiner*—Magda Cruz
(74) *Attorney, Agent, or Firm*—Armstrong, Kratz, Quintos, Hanson & Brooks, LLP

(57) ABSTRACT

It is an object of the present invention to provide a self-standing manually operated elevating screen which makes it possible to raise and lower the screen over a long period of time without encountering any trouble such as damage, deformation or the like, and which makes it possible to simplify the construction used for this purpose. The upper-end supporting member 4 to which one end of the screen 1 is connected and the base member 3D to which the other end of the screen 1 is connected are pivot-connected by left and right linking mechanisms 5, 5. Urging means 16, 16 which are used to urge the lower side arms 13, 13 upward are provided, and slide members 20, 20 that are free to slide are fit over either the let and right upper side arms 11, 11 or the left and right lower side arms 13, 13, or both. These left and right slide members 20, 20 are connected so that these members are free to rotate in relative terms on a vertical line S that is positioned in the approximate center of the screen 1 in the transverse direction of the screen.

5 Claims, 13 Drawing Sheets

FOREIGN PATENT DOCUMENTS

| | | |
|---|---|---|
| JP | 3-18529 | 2/1991 |
| JP | 05034826 A * | 2/1993 |
| JP | 05210168 A * | 8/1993 |
| JP | 06051403 A * | 2/1994 |

* cited by examiner (a)

(b)

(c)

(a)

(b)

SELF-CONTAINED MANUAL LIFTING SCREEN

TECHNICAL FIELD

The present invention relates to a self-standing manually operated elevating screen which is constructed so that the screen can be deployed upward by lifting an upper-end supporting member by hand, and so that the deployed screen can be taken up and accommodated inside a casing by pushing the upper-end supporting member downward, thus allowing the screen to be carried.

BACKGROUND ART

Various types of the abovementioned self-standing manually operated elevating screens have been proposed. For example, a system has been used in which the screen is held in a deployed position by pivot-connecting the upper end of a pantograph type linking mechanism to the approximate center of the upper-end supporting member of the screen with respect the transverse direction of the screen).

However, in cases where the upper end of a linking mechanism is pivot-connected only to the approximate center of the upper-end supporting member of the screen with respect to the transverse direction of the screen as described above, the left-right balance adjustment and the like must be performed with high precision in order to accomplish the smooth extension and retraction of the linking mechanism with good stability, and in order to cause the screen to stand by itself with good stability. Furthermore, smooth raising and lowering of the screen cannot be accomplished unless the raising and lowering of the screen is effected via the center of the upper-end supporting member with respect to the transverse direction, so that there may be a drop in operability.

For example, a screen which is constructed so that the left and right ends of an upper-end supporting member and the left and right ends of a supporting frame are connected and supported by means of left and right linking mechanisms consisting of upper-end side arms and supporting-frame side arms, thus making it possible to accomplish the smooth extension and retraction of the linking mechanisms with good stability, and to cause the screen to stand by itself with good stability, has already been proposed as a screen which solves the abovementioned problems (for example, see FIG. 1 of Japanese Patent No. 3243037.

However, the abovementioned screen disclosed in Japanese Patent No. 3243037 (See FIG. 1 of Japanese Patent No 3243037) has a construction in which the left and right linking mechanisms can be freely extended and retracted independently of each other, and has a construction in which the left and right linking mechanisms are caused to move in linkage with one end [of each linking mechanism] connected to the upper-end supporting member. Accordingly, if the screen is pushed downward by way of the left or right end portion of the upper-end supporting member of the screen in a deployed state, the upper-end supporting member will first drop considerably on the side that is pushed, thus causing this member to assume an inclined attitude, so that the linking mechanism on the side that has dropped is greatly shortened. As a result, a large load is applied only to the linking mechanism on the shortened side, and this may lead to deformation or damage of the linking mechanism.

With the foregoing in view, it is an object of the present invention to provide a self-standing manually operated elevating screen which makes it possible to raise and lower the screen over a long period of time without the occurrence of any trouble such as deformation, damage or the like, and which makes it possible to simplify the construction that is used for this purpose.

DISCLOSURE OF THE INVENTION

In order to solve the abovementioned problems, the self-standing manually operated elevating screen of the present invention is characterized in that: a take-up member to which one end of the screen is connected in order to take up the screen is attached to a base member in a state in which this take-up member is urged in the take-up direction; the base member and an upper-end supporting member to which the other end of the screen is connected are pivot-connected by linking mechanism formed by the pivot connection of upper side arms and lower side arms, with the linking mechanisms being separated into the left and right sides of the approximate center of the screen with respect to the transverse direction thereof; the pivot connection part of the upper side arm disposed on the left side in the transverse direction of the screen and the lower side arm disposed on the same side is disposed on the right side with respect to the transverse center portion of the upper-end supporting member, and the pivot connection part of the upper side arm disposed on the right side in the transverse direction of the screen and the lower side part disposed on the same side is disposed on the left side with respect to the transverse center portion of the upper-end supporting member; urging means for urging the lower side arms upward are installed between the lower side arms and the base member; and slide members which are freely slidable are attached either to the left and right upper side arms or the left and right lower side arms, or to both the left and right upper side arms and the left and right lower side arms, these left and right slide members being connected so that the slide members are capable of relative rotation on a vertical line positioned in the approximate center of the screen with respect to the transverse direction of the screen.

The screen can be smoothly and stably supported by the extension and retraction of the linking mechanisms disposed on the left and right sides when the screen is pulled upward (raised) and placed in the attitude of use, or when the screen is pushed downward and placed in an accommodated attitude. Furthermore, for example, if the right end or left end (with respect to the transverse direction of the screen) of the upper-end supporting member of the screen in the deployed state (use state) is pushed downward, or if the right end or left end (with respect to the transverse direction of the screen) of the upper-end supporting member of the screen in the accommodated state is pulled upward, the amounts of extension or retraction of the left and right linking mechanisms, i.e., the swinging angles of the left and right arms, will differ. As a result, the connected slide members cannot slide (move). In other words, unless the amounts of extension or retraction of the left and right linking mechanisms are the same, the extension and retraction actions of the linking mechanisms are forcibly stopped. In short, the raising or lowering of the screen can be accomplished by causing the left and right linking mechanisms to perform specified extension or retractions operations that are constantly determined, i.e., by always insuring that the swinging angles of the left and right arms are the same, so that the left and right linking mechanisms can be extended or retracted with good stability by the same integrally linked movements. Furthermore, it is conceivable that a large device such as a left-right balancing mechanism or the like could be attached in order to insure the stable extension and retraction of the let and right linking mechanisms; in such a case, however, the size of the apparatus would be increased, and the cost would also be increased. The extension and retraction operations of the left and right arms can always be regulated to the same movements merely by connecting two slide members installed on the left and right arms as in the present invention, so that the raising and lowering of the screen can be accomplished in a smooth manner.

Stopper members which are used to stop the movement of the left and right slide members attached to the abovementioned left and right arms in the longitudinal direction of the arms by contacting [the slide members] when the attitude of the left and right arms is altered to a horizontal attitude are disposed on the abovementioned arms.

Accordingly, if the attitude of the screen is switched from the use attitude to the accommodated attitude, the left and right arms, i.e., the left and right upper side arms, left and right lower side arms or both sets of left and right arms, are placed in a horizontal attitude, so that the left and right slide members that are free to move with respect to the arms contact the stopper members, thus making it possible to maintain the slide members in specified positions. As a result, in cases where the screen is switched from the accommodated attitude to the use attitude, the need to position the respective slide members in specified positions, i.e., the need to adjust the respective slide members to a state in which the connected positions of the slide members are located on a vertical line positioned in the approximate center of the screen with respect to the transverse direction of the screen, can be eliminated.

The abovementioned stopper members may be constructed so that these stopper members also serve as attachment members used to attach one end of each of the abovementioned urging means to the arms.

The abovementioned slide members consist of two split cases, and holding parts that are used to hold (in a manner that allows free rotation) head parts disposed on both ends of pins used to connect the split cases so that the split cases are capable of relative rotation are disposed on the respective split cases; as a result, the split cases can easily be mounted on the assembled linking mechanisms, and both split cases can be connected to each other by the pins in a manner that allows free relative rotation with little frictional resistance.

A screen deployment position regulating member, which comes into contact with the upper end of at least one of the two slide members attached to the left and right arms and prevent the slide member(s) from moving upward during the deployment of the screen, is attached at least one of the left and right arms.

For example, in cases where screens of different sizes are assembled, the position of the upper end of the screen in the case of maximum deployment of the screen must be altered. In such cases, the gas springs that are used to urge the lower side arms upward must be prepared as separate gas springs with a different capacity (driving force). Furthermore, the position of the upper end of the screen in the case of maximum deployment of the screen is set lower than the maximum deployment position so that the image [projected on the screen] cannot be seen. In this case, screens of different sizes can be assembled using the same parts by altering the maximum deployment position of the screen by means of a screen deployment position regulating member as described above; furthermore, the image can also be seen by holding the screen in a position that is lower than the maximum deployment position. If the abovementioned screen deployment position regulating member is constructed from a member that can be freely fastened or released in an arbitrary position with respect to the arm, the maximum deployment position of the screen can be adjusted over a broad range.

BRIEF DESCRIPTION OF THE DRAWINGS

FIG. 8($b$) is an enlarged view of essential parts which shows the attachment parts of the slide members of the elevating screen showing an attitude that is intermediate between the use attitude and accommodated attitude;

FIG. 8($c$) is an enlarged view of essential parts which shows the attachment parts of the slide members of the elevating screen in the accommodated attitude;

FIG. 12($b$) is an explanatory diagram of essential parts which shows a state immediately prior to the point where the upper end of the slide member contacts the lower end of the screen deployment position regulating member as a result of the extension of the linking mechanism.

BEST MODE FOR CARRYING OUT THE INVENTION

Figure 3:
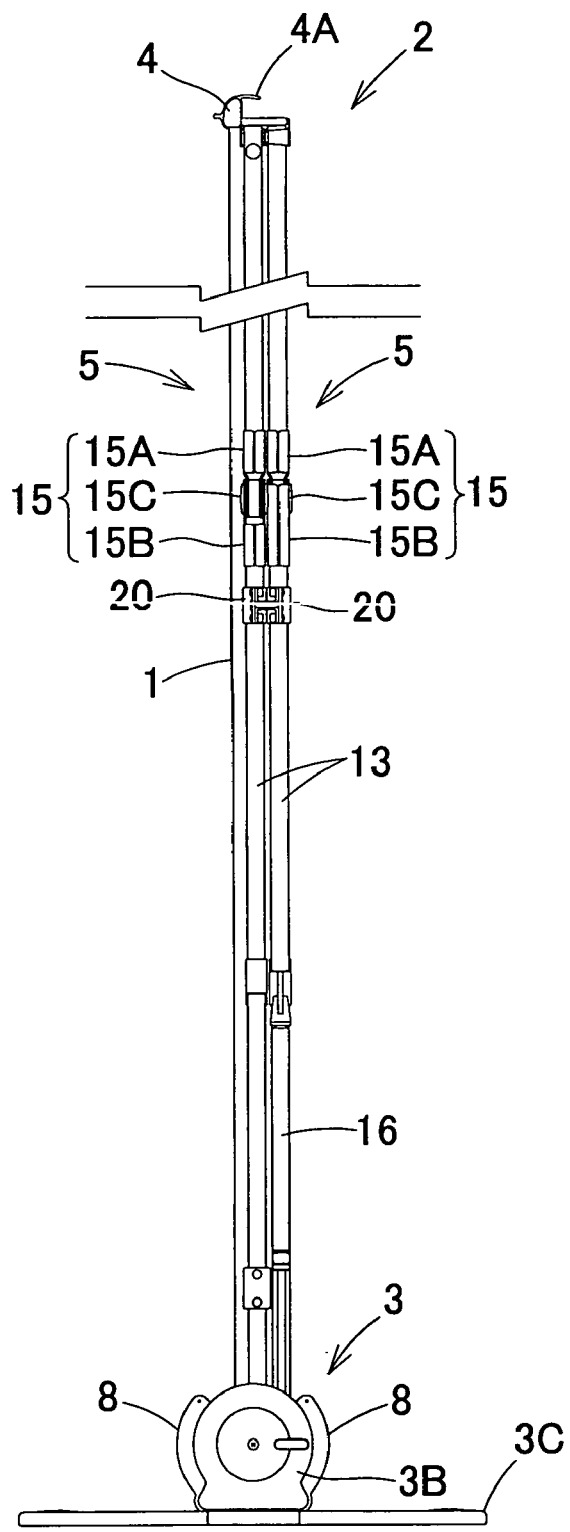
FIG. 3 is a partially cut-away side view of the screen in the use attitude.
Figure 4:
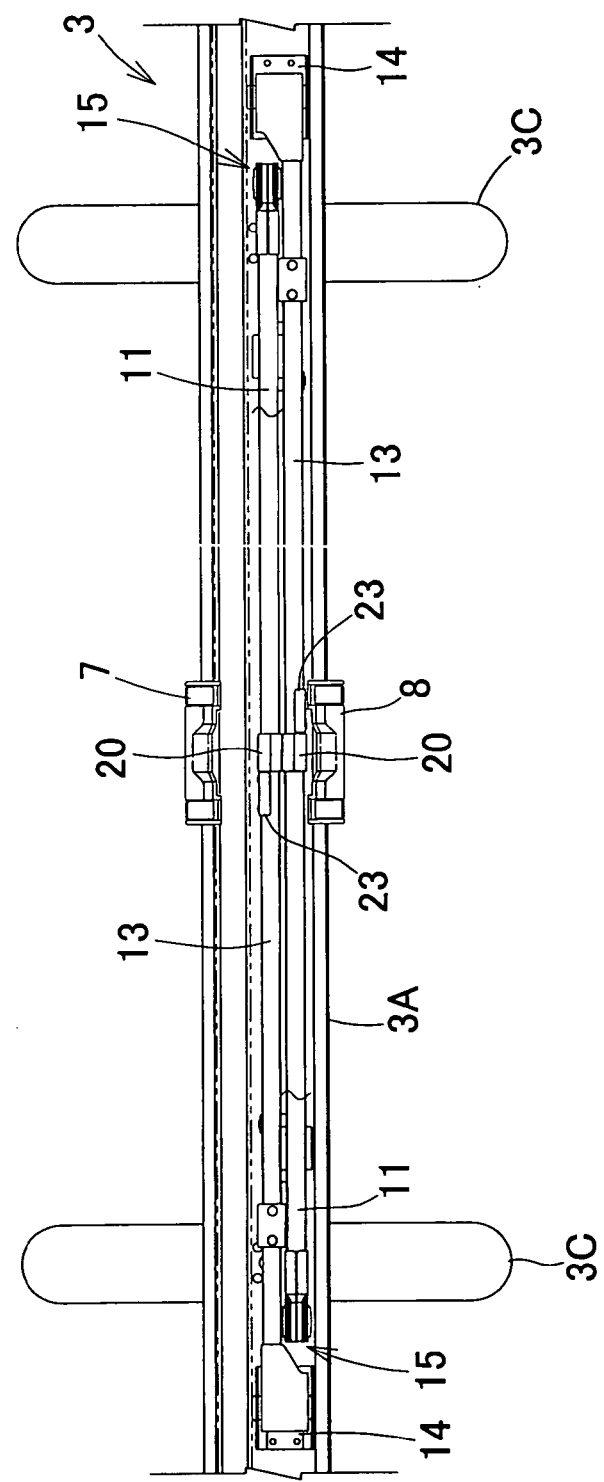
FIG. 4 is a plan view (with a portion of the screen omitted) of the elevating screen in the accommodated attitude.
Figure 5:
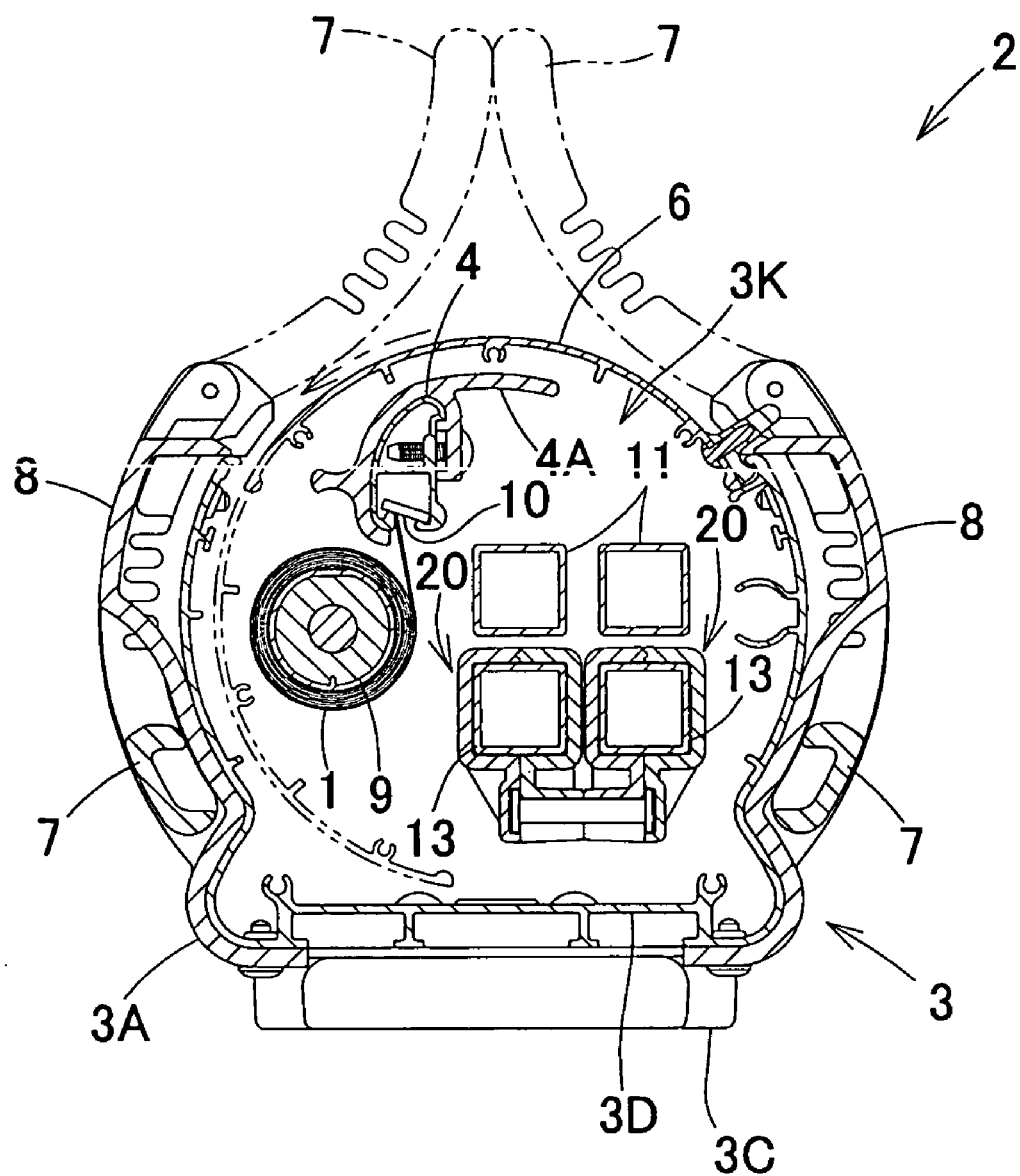
FIG. 5 is a longitudinal sectional side view of the elevating screen in the accommodated attitude.

FIGS. 1 through 5 show a light-weight compact (handy type) self-standing accommodated elevating screen (hereafter referred to as a "elevating screen") 2 in which the screen (the size of the screen may be a size other than that shown in the figures) 1 can be accommodated and carried. Furthermore, in the following description, the longitudinal direction of the casing 3 that is used to accommodate the elevating screen 2 shown in FIG. 1 (i.e., the width direction of the screen) will be taken as the transverse direction, and the direction perpendicular to the longitudinal direction of the abovementioned casing 3 (width direction of the screen) will be taken as the cross direction. The abovementioned elevating screen 2 comprises the abovementioned casing 3 which is used to take up and accommodate the abovementioned screen 1, and left and right linking mechanisms 5, 5 (see FIG. 5) which are disposed on the back the of the abovementioned screen 1, and whose upper ends are pivot-connected to the left and right ends of an upper-end supporting member 4 to which the upper end of the abovementioned screen 1 is connected. 6 shown in FIG. 5 is a cover member which can be freely opened and closed, and which is used to close the upper opening part 3K of the abovementioned casing 3; furthermore, 7 shown in FIGS. 1 and 5 indicates a pair of front and rear handles which are used when the elevating screen 2 is carried. These handles 7 are attached in manner that allows free swinging about the horizontal axis to supporting members 8, 8 that are screw-fastened to the abovementioned casing 3; furthermore, these handles 7 are constructed so that the handles 7 are free to swing between an accommodated attitude indicated by the solid line in FIG. 5 and a use attitude (indicated by the two-dot chain line) positioned above the casing 3. In some cases, however, these handles 7 may be omitted. The abovementioned elevating screen 2 is not limited to the construction shown in the figures; the shape, size and the like may be freely altered.

Figure 1:
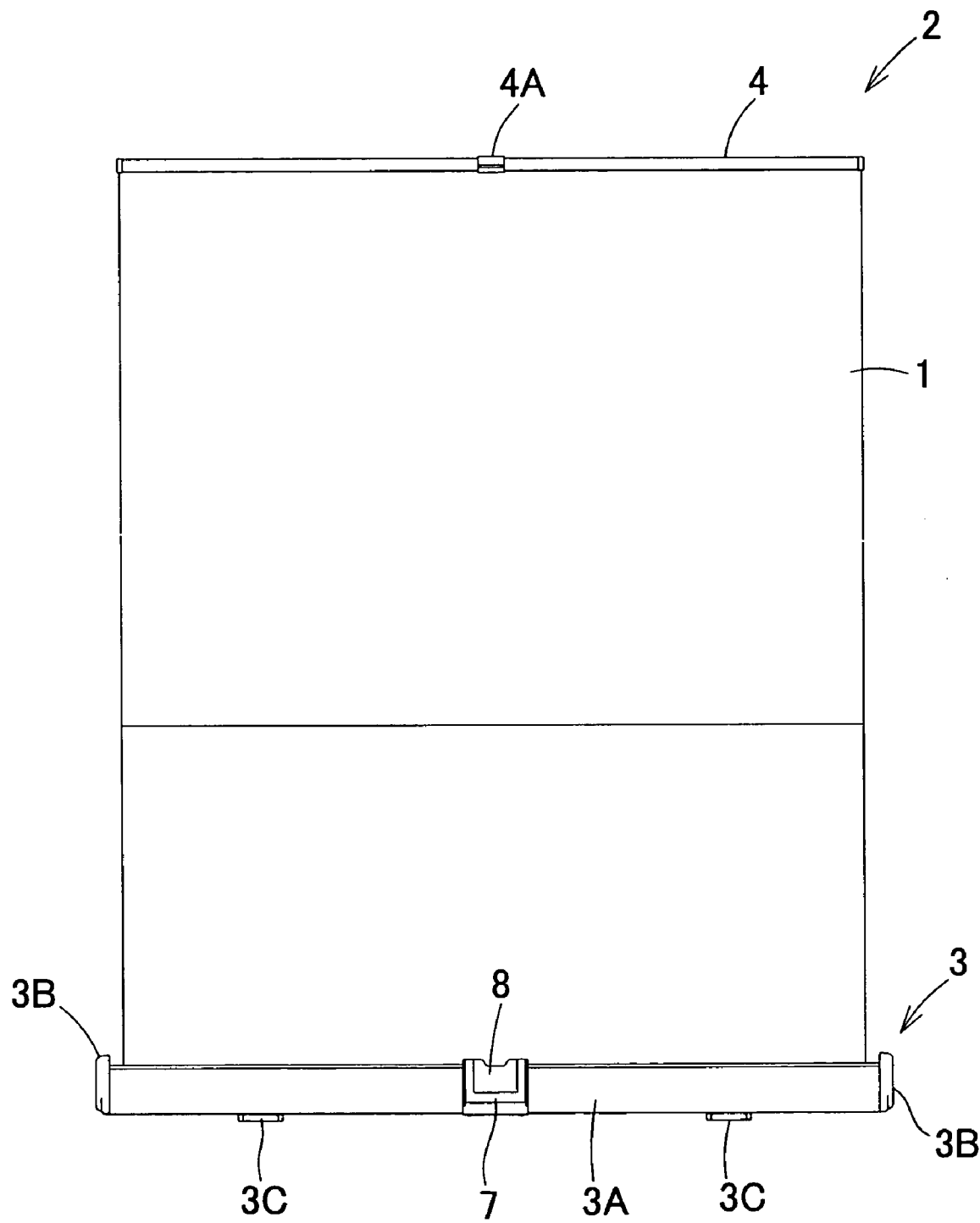
FIG. 1 is a front view of the elevating screen in the use attitude.

As is shown in FIGS. 1 and 5, the abovementioned casing 3 consists of a tubular casing main body 3A which is more or less C-shaped in cross section, and in which the abovementioned upper opening part 3K is formed, end part caps 3B, 3B which are used to close off the opening parts on the left and right ends of this casing main body 3A, and leg parts 3C, 3C which are more or less rectangular as seen in a plan view, and which are attached to the undersurface of the abovementioned casing main body in two specified locations on the left and right so that these leg parts 3C, 3C are free to rotate. The leg parts 3C, 3C are constructed so that the longitudinal direction of these leg parts can be freely switched between an accommodated (non-use) attitude (see FIG. 5) along the longitudinal direction of the casing 3 and a use attitude (see FIG. 4) perpendicular to the longitudinal direction of the casing 3. However, the leg parts 3C, 3C may also be constructed so that these leg parts are detachable, or may be constructed as fixed leg parts that are fixed in the use attitude; furthermore, if the elevating screen 2 can be stably supported by the bottom surface of the casing 3, the leg parts 3C, 3C may be omitted.

As is shown in FIG. 5, a horizontal plate 3D which is positioned slightly on the upper side is installed on the bottom part of the abovementioned casing main body 3A. This horizontal plate 3D is constructed so that this plate also serves as a base member for the fastening of the abovementioned linking mechanisms 5, 5 and the like; however, it would also be possible to attach a separate base member to the casing main body 3A.

As is shown in FIG. 5, the abovementioned screen 1 is taken up on a tubular take-up pipe 9 used as a take-up member which is supported inside the abovementioned casing 3. The take-up pipe 9 is urged in the take-up direction (rotationally urged in one direction) by urging means such as a spring or the like (not shown in the figures). Furthermore, the upper end of the screen 1 can be connected to the upper-end supporting member 4 by engaging an engaging part 10 which is attached to the upper end of the abovementioned screen 1 with the abovementioned upper-end supporting member 4 (which has a left-right dimension that is more or less the same as the left-right width of the abovementioned screen 1); however, this connection may also be accomplished by some other method. A handle 4A which is used to raise the screen 1 is screw-fastened to the approximate cent raising-and-lowering arm portion of the abovementioned upper-end supporting member 4 (with respect to the left-right direction); however, this handle 4A may be omitted.

Figure 2:
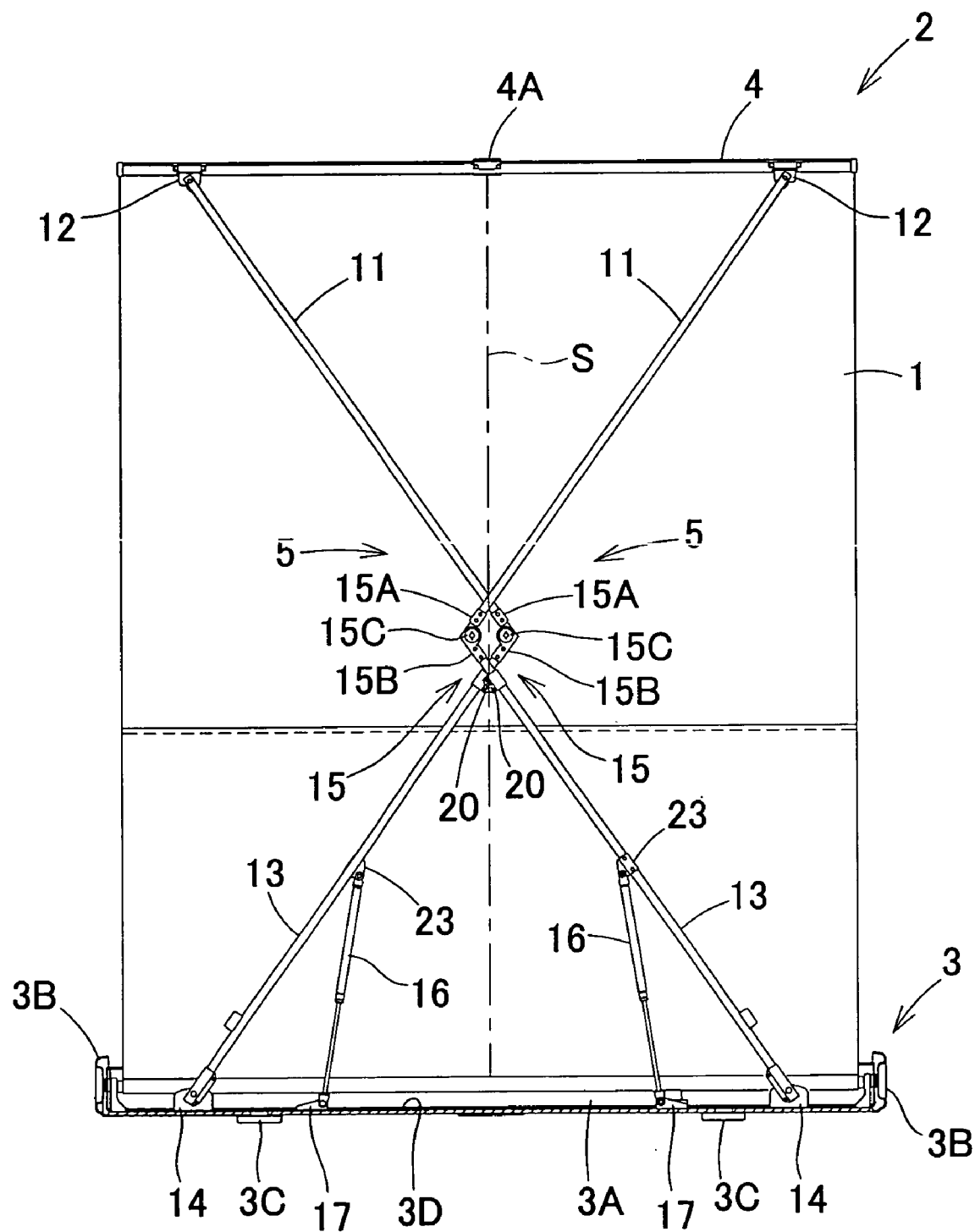
FIG. 2 is a partially sectional back view of the elevating screen in the use attitude.

Next, the abovementioned linking mechanisms 5, 5 will be described. As is shown in FIGS. 2 through 4, the upper ends of left and right upper side arms 11, 11 which are made of metal (some other material may also be used as long as this material has more or less the same strength as a metal material) and which have a square-tube shape (this may also be a cylindrical shape or the like) are respectively pivot-connected via brackets 12 to the left and right end portions (the positions of these connections may also be located slightly toward the center from both end portions, as long as the positions are in the vicinity of the end portions) of the abovementioned upper-end supporting member 4, and the lower ends of left and right lower side arms 13, 13 which are made of metal (some other material may also be used as long as this material has more or less the same strength as a metal material) and which have a square-tube shape (this may also be a cylindrical shape or the like) are respectively pivot-connected to supporting plates 14, 14 which are fastened to the left and right end portions (the positions of these connections may also be located slightly toward the center from both end portions, as long as the positions are in the vicinity of the end portions) of the abovementioned base member 3D; furthermore, the lower ends of the abovementioned left and right upper side arms 11, 11 and the upper ends of the abovementioned left and right lower side arms are respectively pivot-connected to each other on the same sides, thus forming left and right linking mechanisms 5, 5 that can be freely extended and retracted. As a result of the pivot connection of the upper ends of the upper side arms 11, 11 in positions close to the left and right ends of the upper-end supporting member 4 as described above, the raising and lowering of the screen 1 can be accomplished with much greater stability; in some cases, however, the upper ends of the upper side arms 11, 11 may be pivot-connected in positions close to the center with respect to the left-right direction.

Figure 7:
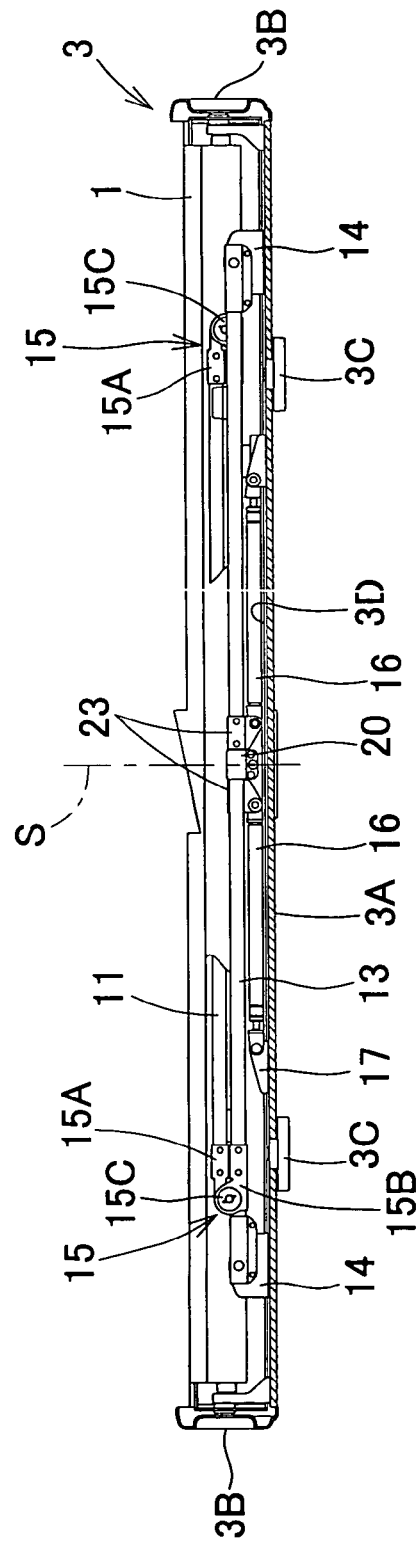
FIG. 7 is a longitudinal sectional back view of the elevating screen in the accommodated attitude.

To describe this in greater detail, the abovementioned left and right linking mechanisms 5, 5 that can be freely extended and retracted are constructed by pivot-connecting the upper ends of the abovementioned left and right upper side arms 11, 11 to the left and right end portions (these connections may also be made in positions that are located slightly toward the center from both end portions, as long as these positions are in the vicinity of the end portions) of the abovementioned upper-end supporting member 4 in a state in which the positions are shifted in the cross direction so that there is no overlapping in the left-right direction, pivot-connecting the lower ends of the abovementioned left and right lower side arms 13, 13 to the left and right end portions (these connections may also be made in positions that are located slightly toward the center from both end portions, as long as these positions are in the vicinity of the end portions) of the abovementioned base member 3D in a state in which the positions are shifted in the cross direction so that there is no overlapping in the left-right direction, and pivot-connecting the lower ends of the abovementioned left and right upper side arms 11, 11 and the upper ends of the abovementioned left and right lower side arms 13, 13 to each other on the same sides via reinforcing connecting members 15, 15 that can be fit over these parts. Furthermore, as a result of the pin body 15C (described later) that constitutes the pivot-connecting part of the connecting member 15 of the left-side linking mechanism 5 (among the two connecting members 15, 15 that pivot-connect the abovementioned upper side arms 11, 11 and lower side arms 13, 13) being constantly positioned on the right side, and the pin body 15C (described later) that constitutes the pivot-connecting part of the connecting member 15 of the remaining right-side linking mechanism 5 being constantly positioned on the left side, a state in which the lower end portions of the upper side arms 11, 11 cross each other and the upper end portions of the lower side arms 13, 13 cross each other is maintained in the state of maximum extension of the linking mechanisms 5; furthermore, the state of maximum extension of the left and right linking mechanisms 5, 5 from the retracted accommodated state is set (limited) so that thee is no overlapping of the two connecting members 15, 15 in the cross direction. Accordingly, since the connecting members 15, 15 which are fit over the arms 11, 11, 13, 13 and which have a larger diameter than these arms do not cross each other, the arms 11, 11, 13, 13 of the left and right linking mechanisms 5, 5 can be positioned in closer proximity to each other in the cross direction; moreover, the extension and retraction range of the linking mechanisms 5, 5 can be limited to a small range, which is also advantageous in terms of durability. Furthermore, as is also shown in FIG. 7, by setting the lengths of the arms 11, 11, 13, 13 [so that] the connecting member 15 which pivot-connects the upper side arm 11 that is positioned on the left side in the extended state and the lower side arm 13 that is positioned on the left side in the extended state is positioned at the right end portion and [so that] the connecting member 15 which pivot-connects the upper side arm 11 that is positioned on the right side in the extended state and the lower side arm 13 that is positioned on the right side in the extended state is positioned at the left end portion in the retracted state of the abovementioned left and right linking mechanisms 5, 5, it is possible to obtain the following advantage: namely, not only is there no protrusion of the linking mechanisms 5, 5 from the screen 2 in the left-right direction during the extension operation of the linking mechanisms 5, 5, but the movement stroke of the screen 2 in the vertical direction can also be increased. However, it would also be possible to work the invention with the length of the arms 11, 11, 13, 13 shortened, and the connecting members 15, 15 disposed so that these members protrude from the left and right sides of the screen 2 (although the size of the casing 3 would be increased in the longitudinal direction).

Figure 8:
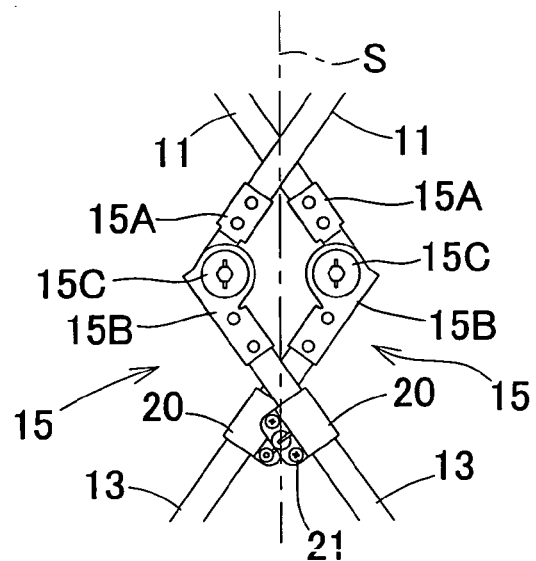
FIG. 8($a$) is an enlarged view of essential parts which shows the attachment parts of the connecting members attached to the elevating screen in a state of maximum deployment (use attitude)
Figure 8:
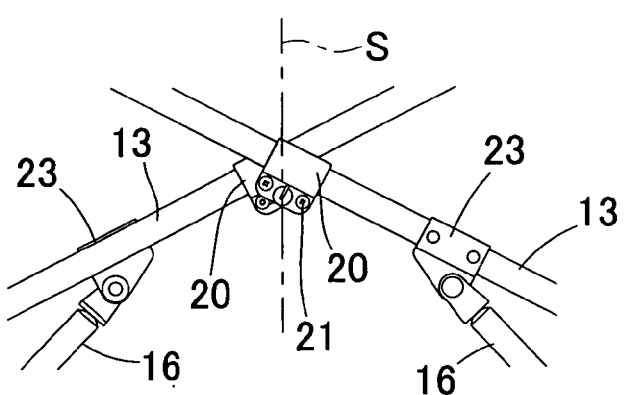
Figure 8:
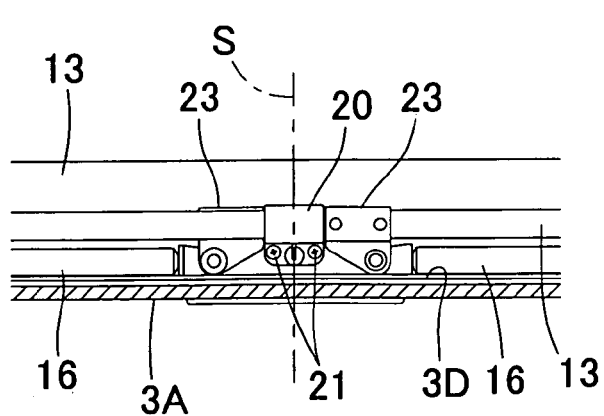

As is shown in FIGS. 2, 3 and 8 (a), [each of] the abovementioned connecting members 15 consists of an upper-side engaging member 15A with a square shape which is fastened in place by being fit over the lower end of the corresponding upper side arm 11, a lower-side engaging member 15B with a square shape which is fastened in place by being fit over the lower end of the corresponding lower side arm 13, and a pin body 15C which constitutes a pivot-connecting part that connects the upper-side engaging member 15A and lower-side engaging member 15B so that these members are free to rotate. However, some other construction may also be used.

As is shown in FIGS. 2 and 3, gas springs (some other construction may also be used) 16, 16 used as urging means that urge the abovementioned lower side arms 13, 13 upward are attached between points located at more or less the centers (with respect to the longitudinal direction) of the lower side arms 13, 13 and brackets 17, 17 which are fastened to the base member 3D in positions that are located further toward the center (with respect to the left-right direction) than the abovementioned supporting plates 14, 14, so that the lowering of the screen 1 can be performed slowly, and so that the screen 1 can be positioned and held in an arbitrary height position. In actuality, furthermore, the screen 1 can be held in an arbitrary height position by balancing all of the factors such as the driving force of the abovementioned gas springs 1, 16, the frictional resistance in the pivot-connecting parts of the abovementioned connecting members 15, 15, the weight of the screen 1 and the like that is applied to the lower side arms 13, 13, the take-up driving force of the screen 1 and the like.

As is shown in FIGS. 2 through 4 and FIGS. 8(a), (b), (c) through 10, slide members 20 each consisting of two split cases 18 and 19 are respectively attached to the abovementioned left and right lower side arms 13, 13, and these left and right slide members 20, 20 are connected on a vertical line S positions in more or less the central portion with respect to the cross direction and the left-right direction so that relative rotation of the members is possible, thus making it possible to extend and retract the left and right linking mechanisms 5, 5 smoothly and with good stability. Here, the slide members 20, 20 are attached to the lower side arms 13, 13; however, it would also be possible to attach the slide members 20, 20 to the upper side arms 11, 11, and the present invention could also be worked by attaching slide members 20, 20, 20, 20 to both the lower side arms 13, 13 and upper side arms 11, 11.

Figure 9:
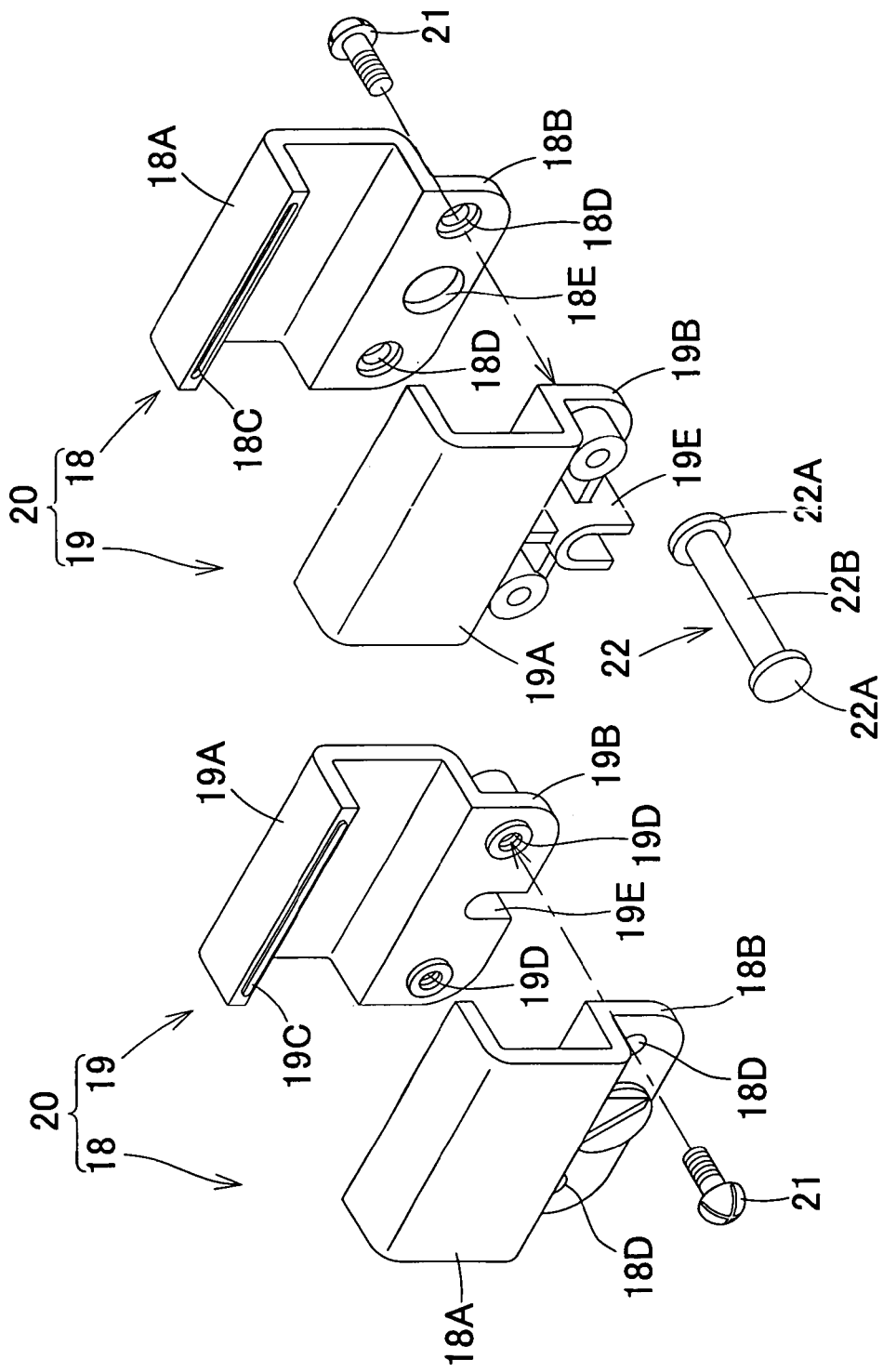
FIG. 9 is an exploded perspective view of the slide members.
Figure 10:
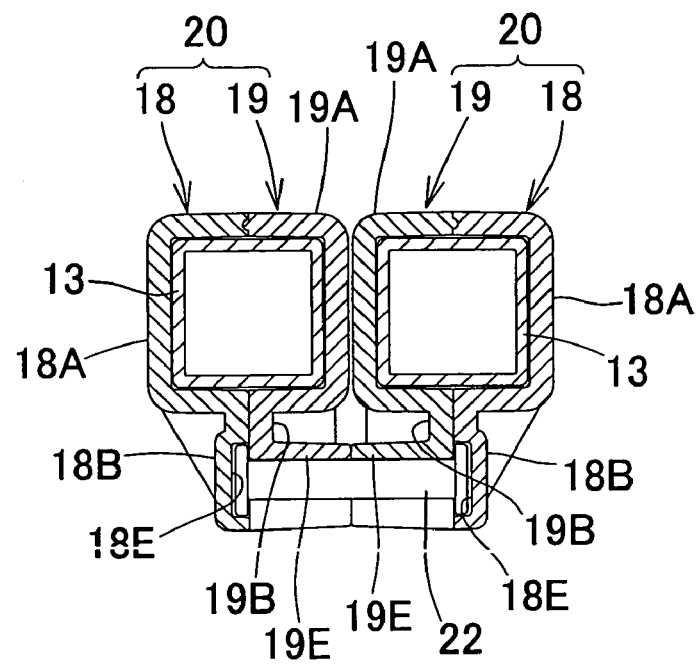
FIG. 10 shows sectional views which illustrate the state in which the slide members are fit over the left and right lower side arms so that the slide members are free to move, with FIG. 10($a$) showing a sectional view cut along the area of the pin, and FIG. 10($b$) showing a sectional view cut along the area of the screws.
Figure 10:
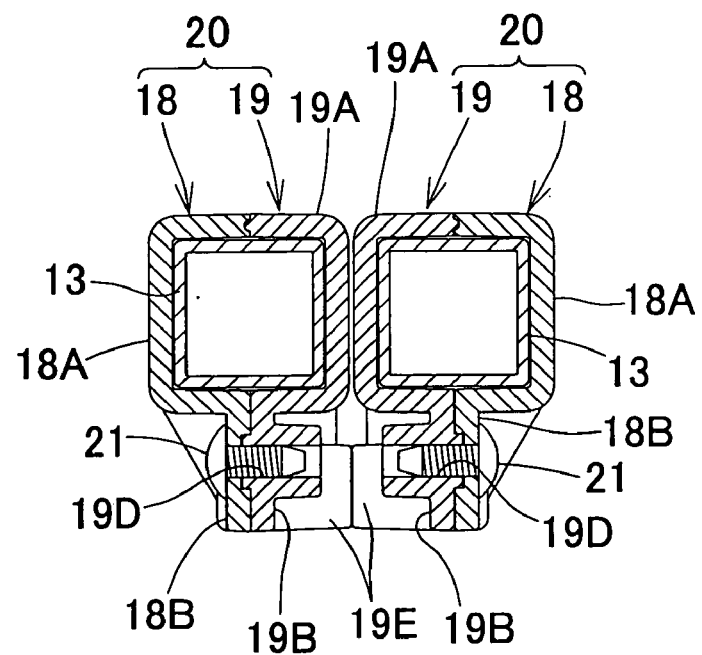

As is shown in FIGS. 9 and 10(a), (b), one split case 18 [of each of the abovementioned slide members 20] consists of a C-shaped case main body 18A which covers approximately half of the outer circumference of the corresponding lower side arm 13, and a connecting plate part 18B which extends downward from the lower end portion of this case main body 18A. The other split case 19 consists of a C-shaped case main body 19A which covers approximately the remaining half of the outer circumference of the corresponding lower side arm 13, and a connecting plate part 19B which extends downward from the lower end portion of this case main body 19A. The two case main bodies 18A and 19A are anchored and fastened together by a recessed part 18C and a projecting part 19C which are respectively formed in the upper-end joining surfaces of the case main bodies 18A and 19A. Furthermore, the system is arranged so that the two split cases 18 and 19 are formed into an integral unit by screwing screws 21, 21 that are passed through a pair of left and right through-holes 18D, 18D formed in the connecting plate part 18B of one split case 18 into screw parts 19D, 19D formed in the connecting plate part 19B of the other split case 19; however, it would also be possible to form these split cases into an integral unit by means of an anchoring mechanism, adhesive agent or the like. Furthermore, a round recessed part 18E which can accommodate the round head part 22A of a pin 22 that is used to pivot-connect the two split cases 18 and 19 so that these split cases are free to rotate relative to each other is formed in the approximate center portion (with respect to the left-right direction) of the connecting plate part 18B of the abovementioned split case 18, and the connecting plate part 19B of the other split case 19 has an arch-form wall part 19E which checks the movement of the head part 22A of the abovementioned accommodated pin 22 in the axial direction by contacting this head part 22A, and which allows the shaft part 22B of the pin 22 to pass through, and supports this shaft part so that the pin is free to rotate. Here, as a result of the use of the pin 22, the relative rotation of the split cases 18 and 19 can be performed in a state in which there is little friction; however, a part other than this pin 22 may also be used. Accordingly, as a result of the split cases 18 and 19 that are pivot-connected via the pin 22 so that these split cases are free to rotate being fastened to the lower side arms 13, 13 by being fit over these arms so that the split cases are free to slide as shown in FIGS. 10(*a*) and 10(*b*), the left and right linking mechanisms 5, 5 can always be operated smoothly and stably when the screen 1 is switched from the use state to the accommodated state, since a state is obtained in which the lower side arms 13, 13 are connected by the slide members 20, 20 so that these lower side arms 13, 13 always show left-right symmetry at an arbitrary height position. Furthermore, as is shown in FIGS. 4, 7 and 8(*c*), when the lower side arms 13, 13 are in a horizontal attitude constituting the accommodated attitude, the abovementioned slide members 20, 20 are in a free state that allows movement in the horizontal direction. However, movement of the slide members 20, 20 is checked as a result of the slide members 20, 20 contacting the attachment parts 23, 23 formed as more or less C-shaped stopper members disposed on the upper ends of the gas springs 16, 16, so that the slide members 20, 20 can be maintained in this position (on the vertical line S). As a result of the positions of the slide members 20, 20 thus being regulated by the attachment parts 23, 23, the following advantage is obtained: namely, when the spring 1 is switched from the accommodated attitude to the use attitude, the attitude can immediately be altered without moving the slide members 20, 20 to specified positions (on the vertical line S). However, the present invention may also be worked with the attachment members 23, 23 omitted. Furthermore, the advantage of a reduction in the number of parts can be obtained by using the attachment members 23, 23 to construct the stopper members (position regulating members) of the slide members 20, 20; however, these stopper members may also be constructed from other members.

Figure 6:
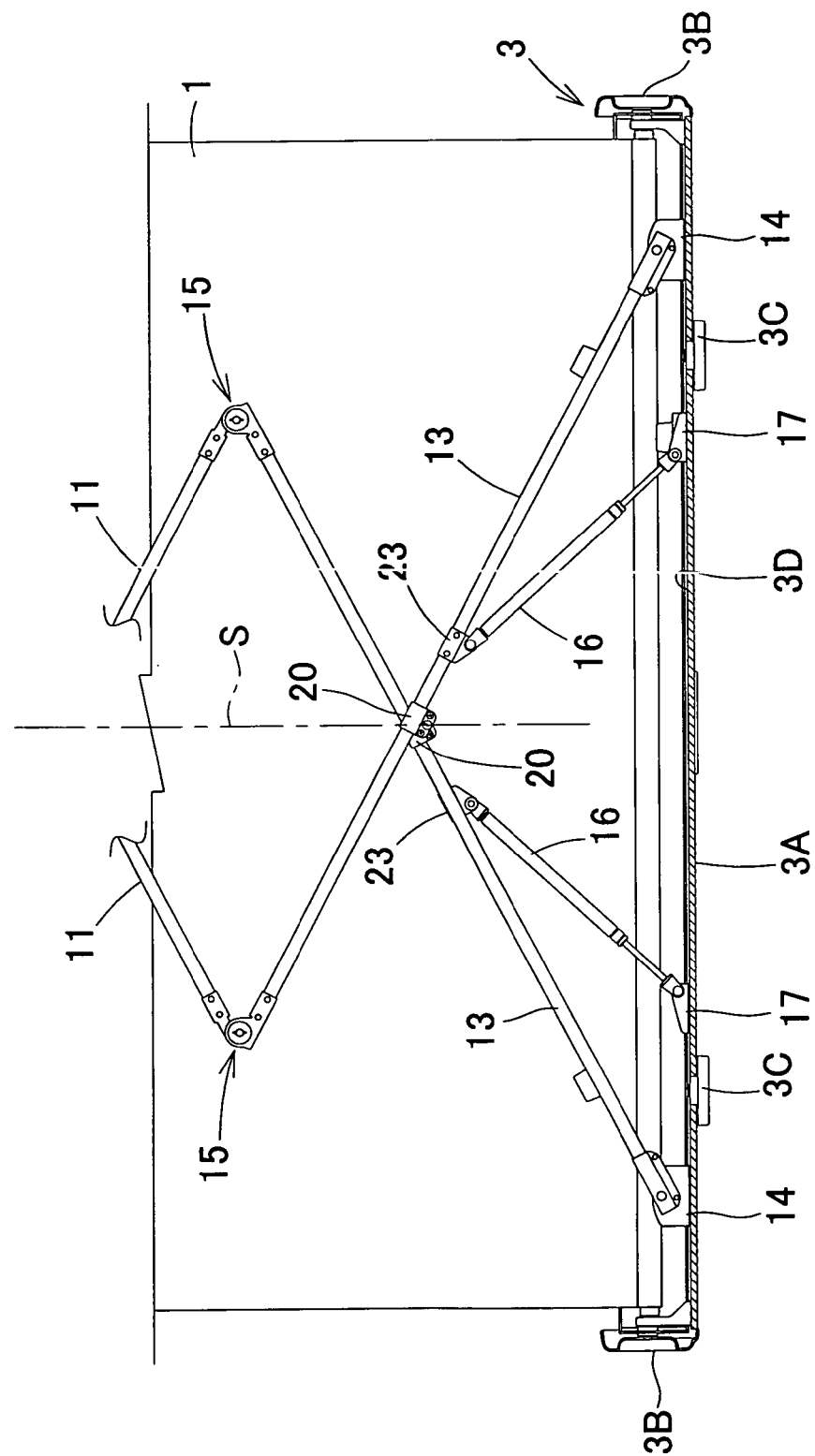
FIG. 6 is a back view (with a portion of the screen omitted) of the elevating screen showing an attitude that is intermediate between the use attitude and the accommodated attitude.

When the abovementioned elevating screen 2 is to be raised and deployed, the elevating screen 2 is first moved to a specified position, and the abovementioned leg parts 3C, 3C are switched to the use attitude that is perpendicular to the longitudinal direction of the casing 3 as is shown in FIGS. 1 through 4. From this state, the cover member 6 shown in FIG. 5 is move in the direction indicated by the arrow, so that the upper opening part 3K is opened. Next, the [elevating screen 2] can be deployed as shown in FIGS. 1 through 3 by lifting the handle 4A to a specific height. When the linking mechanisms 5, 5 perform an extension operation as the abovementioned elevating screen 2 is raised, the slide members 20, 20 slide (move) along the lower side arms 13, 13 while rotating in mutually opposite directions in conformity to the swinging motion of the left and right lower side arms 13, 13 as shown in FIGS. 6 and 8(*b*); as a result, [the slide members 20, 20] move upward along the vertical line S, so that the lower side arms 13, 13 are caused to swing at the same angle by the slide members 20, 20, thus making it possible to raise the elevating screen 2 with good stability. Furthermore, in FIGS. 6 and 8(*b*), a state is shown in which the elevating screen 2 has been raised approximately half-way.

When the abovementioned deployed elevating screen 2 is to be placed in the accommodated state, [the elevating screen 2] is pushed downward by means of the abovementioned handle 4A, so that the linking mechanisms 5, 5 are caused to perform a retraction operation, thus taking up and accommodating the screen 1 inside the casing 3. When the linking mechanisms 5, 5 perform a retraction operation as the abovementioned elevating screen 2 is pushed downward, the slide members 20, 20 slide (move) along the lower side arms 13, 13 while rotating in mutually opposite directions in conformity to the swinging motion of the lower side arms 13, 13 as shown in FIGS. 6 and 8(*b*); as a result, [the slide members 20, 20] move upward along the vertical line S, so that the lower side arms 13, 13 are caused to swing at the same angle by the slide members 20, 20, thus making it possible to push the elevating screen 2 downward with good stability. Furthermore, in FIGS. 6 and 8(*b*), a state is shown in which the elevating screen 2 has be pushed downward approximately half-way. When the retraction operation of the abovementioned linking mechanisms 5, 5 is completed, the slide members 20, 20 contact the attachment members 23, 23 so that the positions of the slide members 20, 20 (positions on the vertical line S) are maintained as shown in FIGS. 7 and 8(*c*). When the retraction operation of the abovementioned linking mechanisms 5, 5 is completed, the cover member 6 is closed. Then, when the elevating screen 2 is to be moved to another location, the leg parts 3C, 3C are switched to the direction o length of the casing 3, so that contact of the leg parts 3C, 3C with other objects can be avoided while the elevating screen 2 is being moved.

Figure 11:
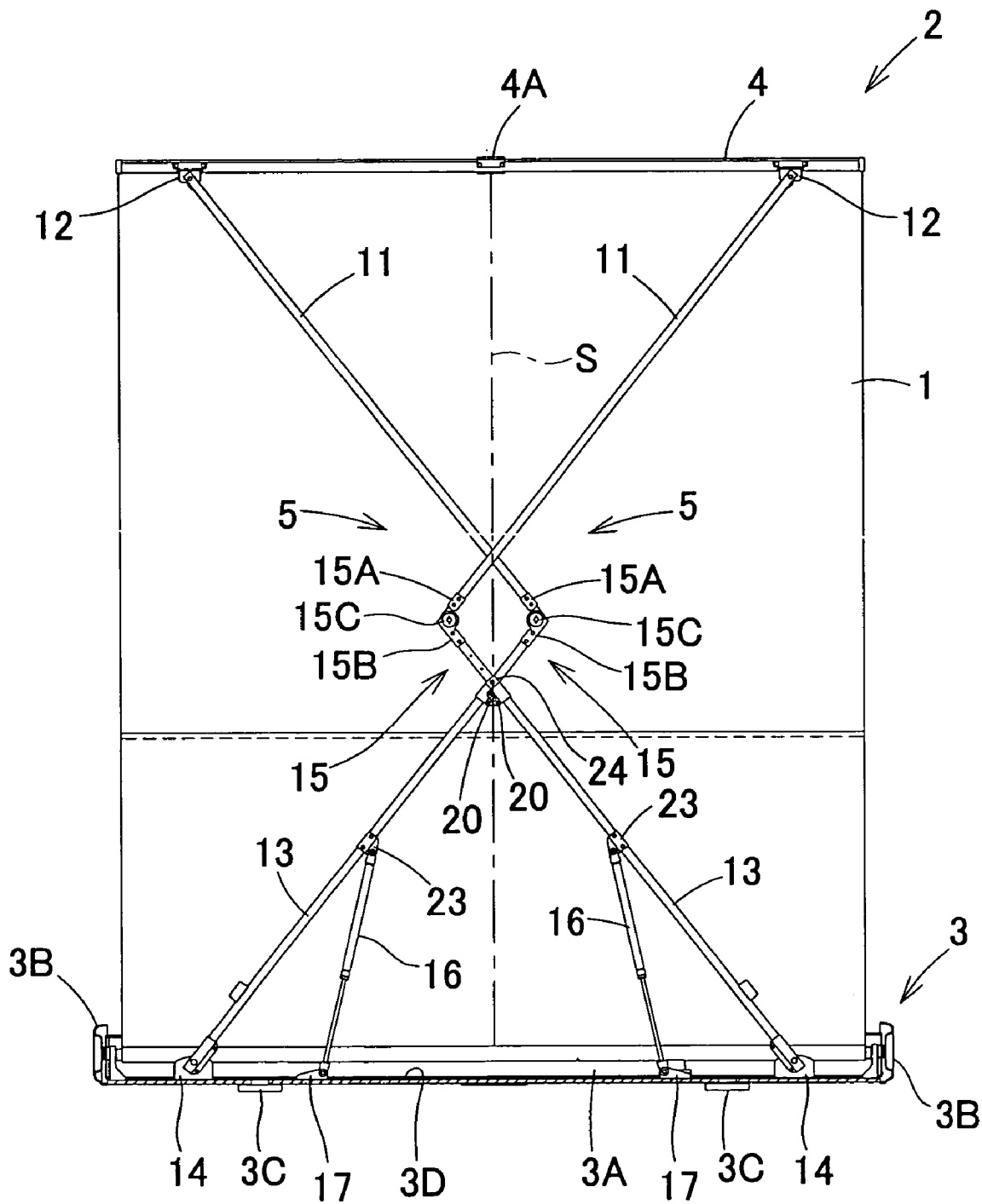
FIG. 11 is a partially sectional back view of the elevating screen in a use attitude in which the screen is lowered slightly from the maximum upper and position shown in FIG. 2.
Figure 12:
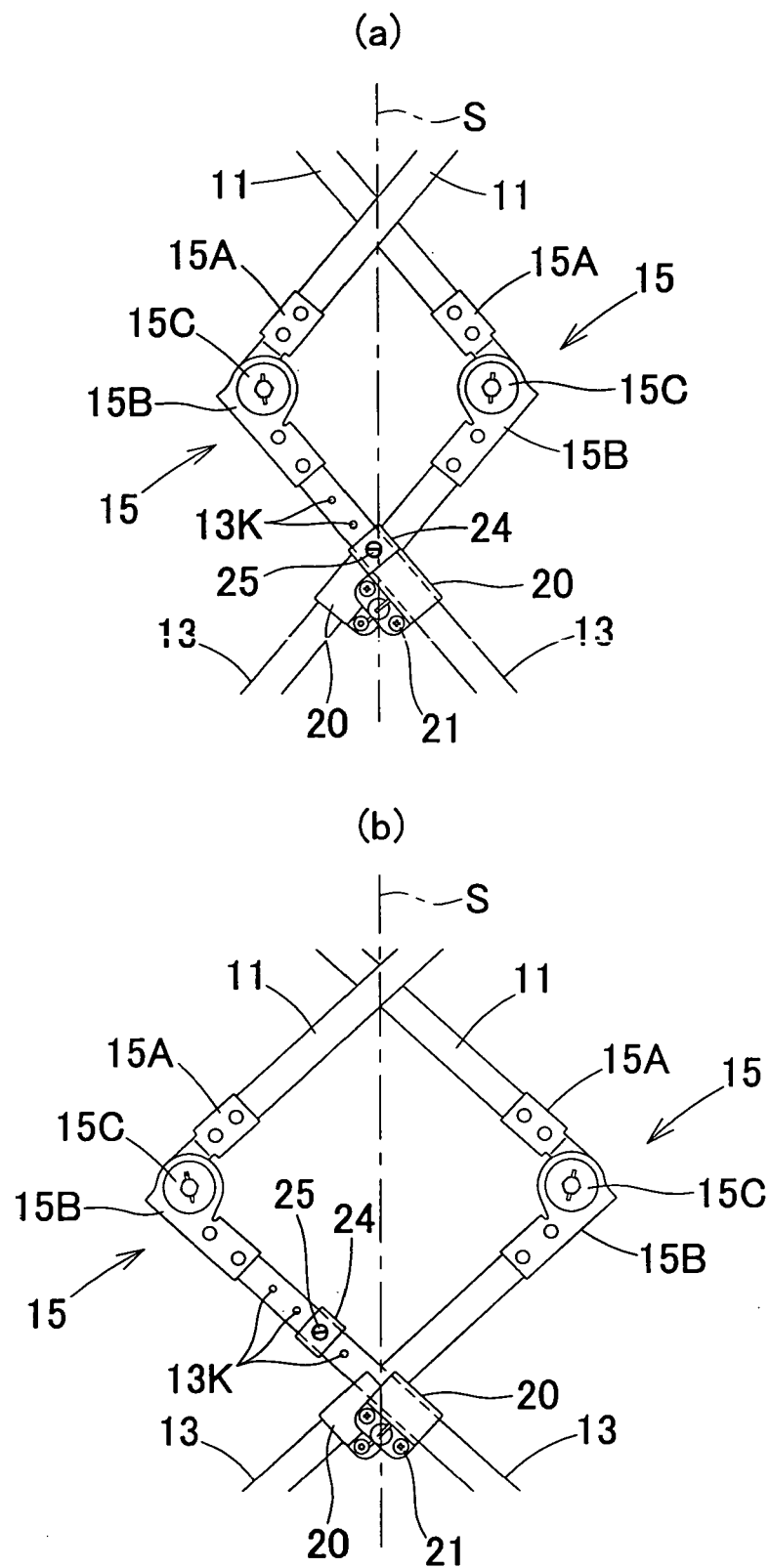
FIG. 12($a$) is an explanatory diagram of essential parts which shows a state in which the upper end of the slide member has contacted the lower end of the screen deployment position regulating member as a result of the extension of the linking mechanism, so that the maximum upper end position of the screen is regulated.
Figure 13:
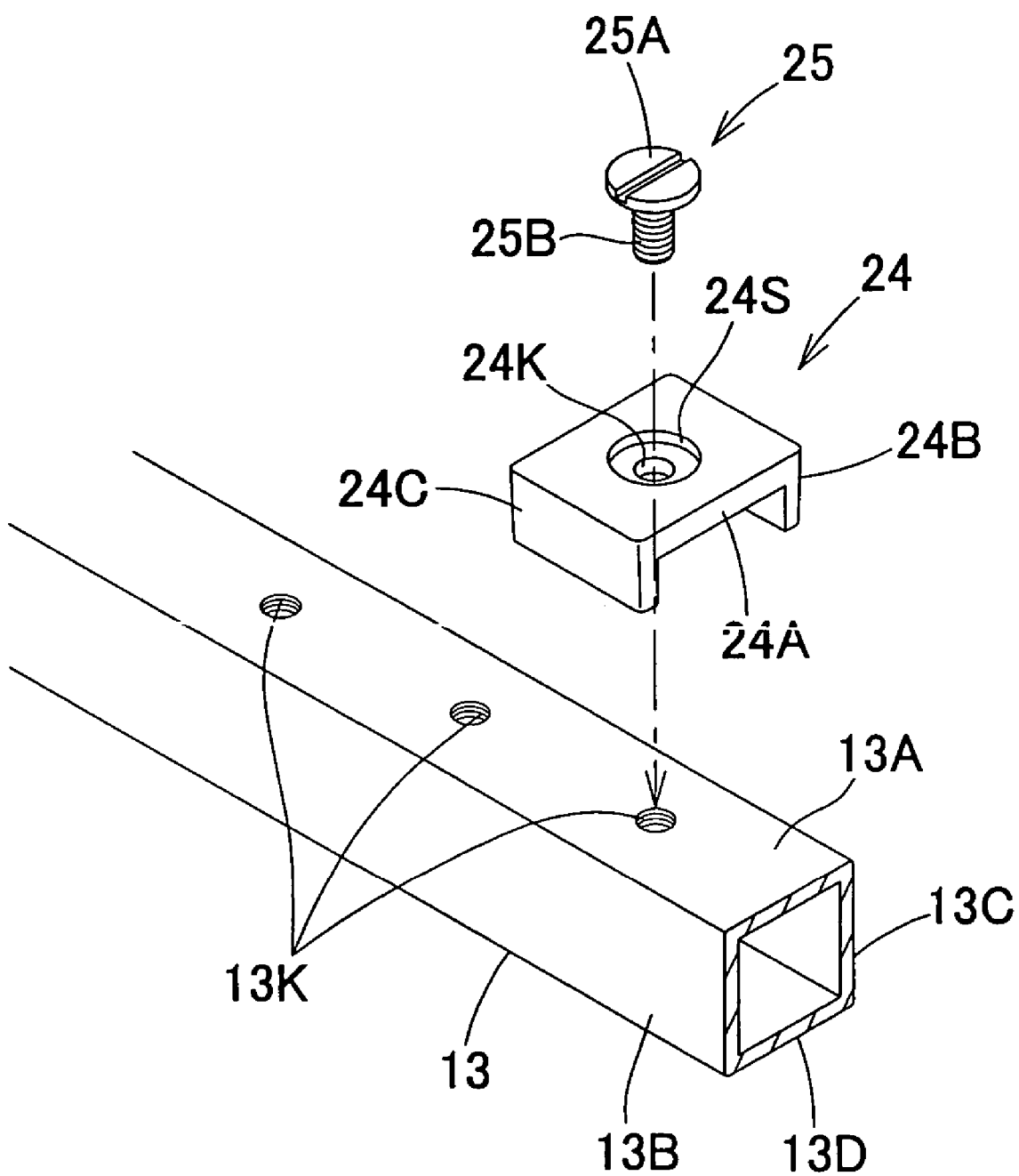
FIG. 13 is a perspective view which shows the state immediately prior to the attachment of the screen deployment position regulating member to the lower side arm.

As is shown in FIGS. 11 through 13, the present invention can also be worked by attaching a screen deployment position regulating member 24 (which is used to check the upward movement of one of the two slide members 20, 20 attached to the abovementioned left and right lower side arms 13, 13 (the slide member positioned in front as seen from the back side of the screen 1 in FIG. 11) during the deployment of the abovementioned screen 1 by contacting this slide member 20) to the right lower side arm 1 in FIG. 11.

The abovementioned screen deployment position regulating member 24 can be formed from a synthetic resin, metal, wood or the like. As is shown in FIG. 13, [this member 24] is formed as a more or less C-shaped member consisting of a plate-form main body part 24A which contacts the first side surface 13A (positioned on the front side in FIG. 11) among the four side surfaces 13A, 13B, 13C and 13D of the [corresponding] lower side arm 13 (which has a rectangular cross-sectional shape), and in which a through-hole 24K that allows the screw part 25B of a screw 25 to pass through is formed in substantially the central portion, and a recessed part 24S (this may be omitted) that is used to completely accommodate the head part 25*a* of the screw 25 is formed in the screw insertion end of this through-hole 24K, and a pair of plate-form extension parts 24C and 24B which extend in the same direction perpendicular to the main body part 24A from both ends of this main body part 24A, and which contact the second side surface 13B and third side surface 13C that are adjacent to the abovementioned first side surface 13A on both sides (these extension parts 24C and 24B need not contact these side surfaces). However, it would also be possible to omit the extension parts 24C and 24B, and to construct this member 24 from the main body part 24A alone (although this would reduce (weaken) the strength of the member 24). Forming the screen deployment position regulating member 24 with a flat-plate shape or C shape in this manner is advantageous in that this allows the member 24 to be mounted even after the screen is assembled. However, a cylindrical or square-tube shape may also be used; [in short,] the screen deployment position regulating member 24 may have any [desired] shape. Furthermore, the abovementioned screen deployment position regulating member 24 is caused to contact the [corresponding] lower side arm 13 in a state in which the through-hole 24K of this member 24 is caused to coincide with a specified screw hole 13K (second screw hole from the bottom in FIG. 12(b)) among a plurality of screw holes 13K (four screw holes in FIG. 12(b)) formed in the lower side arm 13 at specified intervals; then, the screen deployment position regulating member 24 is fastened to the lower side arm 13 using a screw 25. Here, as a result of the screen deployment position regulating member 24 being fastened to the lower side arm 13 using an arbitrary screw hole 13K among the four screw holes 13K formed in the lower side arm 13, the apparatus is constructed so that the maximum upper end position of he screen 1 can be altered to any of four positions, and so that [this maximum upper end position] can be altered to a fifth position that is even higher than the highest position among the abovementioned four positions by removing the screen deployment position regulating member 24. However, it would also be possible to form a single screw hole 13K and thus construct the apparatus so that the maximum upper end position of the screen can be changed to either of two positions by attaching or removing the screen deployment position regulating member 24, or to set the number of screw holes 13K at any desired number. Furthermore, it would also be possible to work the present invention by forming the screw holes 13K as long slots along the longitudinal direction of the lower side arm 13, thus constructing the apparatus so that the screen deployment position regulating member 24 can be fastened in any position within these slots. Moreover, the apparatus is devised so that the screen deployment position regulating member 24 is fastened to the lower side arm 13 using a screw 25. However, it would also be possible (for example) to form one or more anchoring holes in the lower side arm 13, to form anchoring parts that enter the abovementioned anchoring holes on the screen deployment position regulating member 24, and to construct the apparatus so that the screen deployment position regulating member 24 can be freely engaged with or disengaged from the lower side arm 13; moreover, it would also be possible to construct the apparatus so that the screen deployment position regulating member 24 can be freely attached to or detached from the lower side arm by some other means. In some cases, furthermore, it would also be possible to work the present invention by attaching the screen deployment position regulating member 24 to the lower side arm 13 by welding, an adhesive agent or the like so that the screen deployment position regulating member 24 cannot be removed.

Accordingly, when the handle 4A is lifted as described above, the linking mechanisms 5,5 perform an extension operation so that these linking mechanisms 5, 5 are further extended from the state shown in FIG. 12(b), ad the upper end of the slide member 20 contacts the lower end of the screen deployment position regulating member as shown in FIG. 12(a), so that the extension operation of the linking mechanisms 5, 5 is checked, thus making it possible to regulate the upper end a position of the screen 1 in this position.

In the invention, in cases where the screen is pulled upward (raised) and placed in the use attitude, or in cases where the screen is pushed downward and placed in the accommodated attitude, the linking mechanisms disposed on the left and right extend or retract so that the screen can be supported smoothly and with good stability. Furthermore, this invention makes it possible to provide a self-standing manually operated elevating screen in which (for example) the pushing downward of the right end or left end (with respect to the transverse direction of the screen) of the upper-end supporting member of the screen in the deployed state (use state), or the pulling upward of the right end or left end (with respect to the transverse direction of the screen) of the upper-end supporting member of the screen in the accommodated state, can be checked by the slide members, so that the screen can be favorably used over a long period of time without causing any trouble such as deformation, damage or the like as a result of a large extension or retraction operation of only one of the linking mechanisms as in conventional techniques. Furthermore, since the left and right arms can be caused to swing at the same swinging angle by the connected slide members, the left and right linking mechanisms can always be operated by a determined specified operation, so that the left and right linking mechanisms can be smoothly and stably extended or retracted in a state in which these mechanisms are linked as an integral unit. Moreover, in the present invention, the construction can be simplified compared to cases in which a large apparatus such as a left-right balancing mechanism or the like is attached in order to cause stable extension and retraction of the left and right linking mechanisms. Accordingly, the present invention is advantageous in that this invention can prevent an increase in the size of the apparatus and an increase in the cost of the apparatus.

In the invention, the slide members which are in a free state can be maintained in specified positions by the stopper members when the screen is switched from the use attitude to the accommodated attitude. Accordingly, when the screen is switched from the accommodated attitude to the use attitude, there is no need to adjust the slide members to specified positions, i.e., to make individual positional adjustments of the slide members into a state in which the connected positions of the slide members are on a vertical line that is positioned more or less in the center with respect to the transverse direction of the screen. This is advantageous from the standpoint of use.

In the invention, the stopper members are formed by the attachment members that are used to attach one end of each urging means to the arms; as a result, the number of parts required can be reduced, which is advantageous from the standpoints of cost and assembly.

In the invention, the slide members each consist of two split cases, and the respective split cases are equipped with holding parts that are used to hold (in a manner that allows free rotation) the head parts disposed on both ends of a pin that is used to connect both split cases so that the split cases are free to rotate in relative terms. As a result, the split cases can easily be installed afterward on the arms of the assembled linking mechanisms; moreover, both split cases can be connected in a manner that allows free relative rotation in a state in which there is little frictional resistance. This is advantageous from the standpoint of assembly; moreover, this is also advantageous in that the operating force that is used to raise and lower the screen can be reduced.

In the invention, a screen deployment position regulating member which is used to check the upward movement of at least one of the two slide members attached to the left and right arms by contacting the upper end of this slide member during the deployment of the screen is attached to at least one of the arms, i.e., the left arm or right arm. As a result, the maximum deployment position of the screen can be altered, so that screens of different sizes can be assembled suing the same parts, thus making it possible to manufacture screens of different sizes without increasing the number of parts. This is advantageous from the standpoints of manufacture and part control; furthermore, the screen can be manufactured as a screen with a high commercial product vale that allows alteration of the use configuration (e.g., viewing in a lowered state or the like).

The invention claimed is:

1. A self-standing manually operated elevating screen which is characterized in that:
a take-up member to which one end of the screen is connected in order to take up the screen is attached to a base member in a state in which this take-up member is urged in the take-up direction;
said base member and an upper-end supporting member to which the other end of said screen is connected are pivot-connected by linking mechanism formed by the pivot connection of upper side arms and lower side arms, with the linking mechanisms being separated into the left and right sides of the approximate center of the screen with respect to the transverse direction thereof;
the pivot connection part of the upper side arm disposed on the left side in the transverse direction of said screen and the lower side arm disposed on the same side is disposed on the right side with respect to the transverse center portion of said upper-end supporting member, and the pivot connection part of the upper side arm disposed on the right side in the transverse direction of said screen and the lower side part disposed on the same side is disposed on the left side with respect to the transverse center portion of said upper-end supporting member;
urging means for urging said lower side arms upward are installed between said lower side arms and said base member; and
slide members which are freely slidable are attached either to said left and right upper side arms or said left and right lower side arms, or to both said left and right upper side arms and said left and right lower side arms, these left and right slide members being connected-so that the slide members are capable of relative rotation on a vertical line positioned in the approximate center of said screen with respect to the transverse direction of said screen.

2. The self-standing manually operated elevating screen according to claim 1, wherein said arms are provided with stopper members so that the stopper members come into contact with the left and right slide members attached to said left and right arms and prevent them from moving in the longitudinal direction of said arms in cases where the attitude of said arms is altered to a horizontal attitude are disposed on said arms.

3. The self-standing manually operated elevating screen according to claim 2, wherein said stopper members are constituted by attachment members that are used to attach one end of said urging means to the arms.

4. The self-standing manually operated elevating screen according to claim 1, wherein said slide members each comprise two split cases, and each of said split cases is provided with a holding part for rotatably holding head parts that are disposed on both ends of a pin that is used to connect the split cases so as to allow relative rotation of said split cases.

5. The self-standing manually operated elevating screen according to any of claims 1 through 4, wherein a screen deployment position regulating member, which comes into contact with the upper end of at least one of the two slide members attached to said left and right arms and prevent the slide member(s) from moving upward during the deployment of said screen, is attached at least one of said left and right arms.

* * * * *